United States Patent
Kekedjian et al.

(10) Patent No.: US 7,430,899 B2
(45) Date of Patent: Oct. 7, 2008

(54) METHODS AND SYSTEMS FOR TESTING ELECTROMAGNETICALLY ACTUATED FUEL INJECTORS

(75) Inventors: Harry Kekedjian, Tecumseh (CA); Roderick Simpson, Windsor (CA); Alexander Marrocco, Windsor (CA)

(73) Assignee: Ford Motor Company, Dearborn, MI (US)

( * ) Notice: Subject to any disclaimer, the term of this patent is extended or adjusted under 35 U.S.C. 154(b) by 42 days.

(21) Appl. No.: 11/553,589

(22) Filed: Oct. 27, 2006

(65) Prior Publication Data

US 2008/0148831 A1    Jun. 26, 2008

(51) Int. Cl.
G01M 15/04    (2006.01)

(52) U.S. Cl. ..................................... 73/114.45

(58) Field of Classification Search ............... 73/119 A, 73/114.38, 114.42, 114.43, 114.45, 114.46, 73/114.47, 114.48, 114.49, 114.51, 114.52, 73/114.53

See application file for complete search history.

(56) References Cited

U.S. PATENT DOCUMENTS

| | | | |
|---|---|---|---|
| 6,234,002 B1 * | 5/2001 | Sisney et al. ................. | 73/1.57 |
| 6,513,371 B1 * | 2/2003 | Jett et al. .................... | 73/119 A |
| 6,754,604 B2 * | 6/2004 | Weiland ...................... | 702/114 |
| 6,761,059 B2 * | 7/2004 | Hsia et al. ................... | 73/119 A |
| 6,879,903 B2 * | 4/2005 | Jaliwala et al. .............. | 701/104 |

* cited by examiner

*Primary Examiner*—Eric S McCall
(74) *Attorney, Agent, or Firm*—Raymond L. Coppiellie; Brooks Kushman P.C.

(57) ABSTRACT

Current based methods and systems for testing an electromagnetically actuated fuel injector of an engine are provided. In at least one embodiment, an injector is commanded to actuate, data about a current associated with the command is collected, and a determination is made regarding whether the injector is functioning properly based on the data.

17 Claims, 6 Drawing Sheets

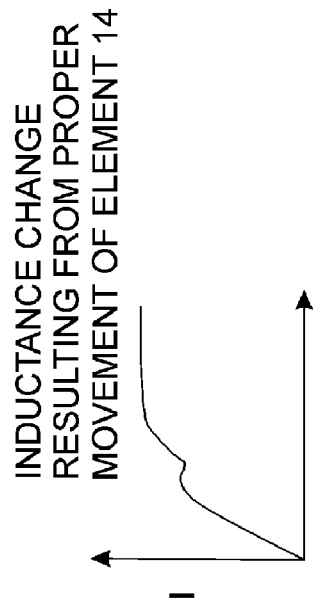
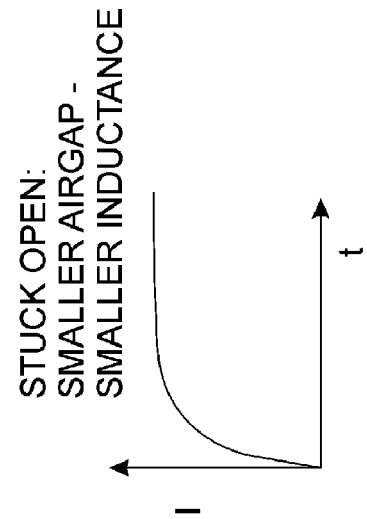
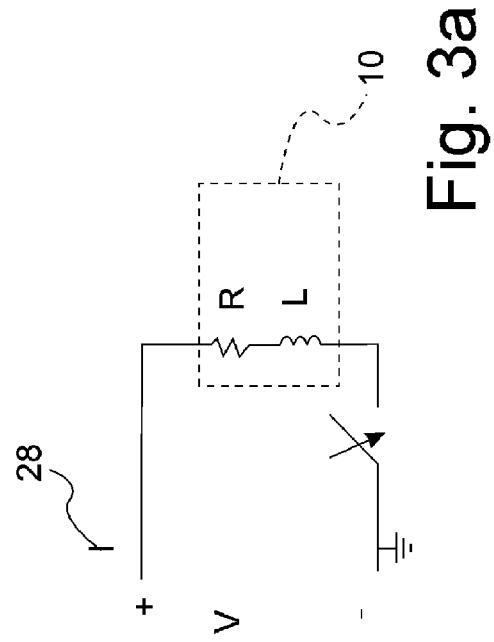
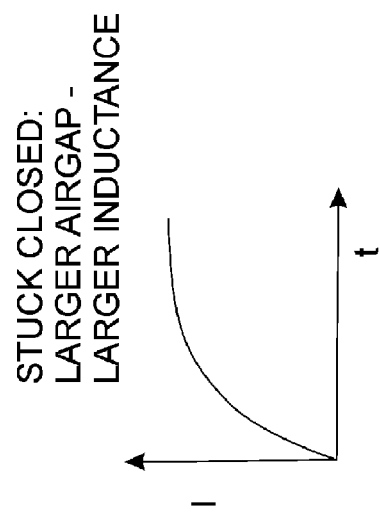

METHODS AND SYSTEMS FOR TESTING ELECTROMAGNETICALLY ACTUATED FUEL INJECTORS

BACKGROUND OF THE INVENTION

1. Field of the Invention

The invention relates to methods to test electromagnetically actuated fuel injectors.

2. Background Discussion

An electromagnetically actuated fuel injector of an engine may be tested for proper function by pressurizing the engine's fuel rail with air, actuating the injector, and measuring the pressure drop in the fuel rail upstream of the injector.

Pressurizing the fuel rail and measuring the pressure drop may require costly equipment. Also, residual fluids introduced into the injector during its manufacture may be released during this testing process.

A less costly method for testing an electromagnetically actuated fuel injector that also reduces or eliminates the release of residual fluids is desired.

SUMMARY OF THE INVENTION

In at least one embodiment, the invention takes the form of a method for testing a fuel injector for an engine. The fuel injector has an electromagnetically actuated control valve element. The method includes commanding the injector to move the valve element between an open position and a closed position. The method also includes collecting data about a current associated with the command and comparing the data to a predetermined set of data. The method further includes determining if the injector is functioning properly based on the comparison between the data and the predetermined set of data.

In at least one embodiment, the invention takes the form of a method for testing a fuel injector for an engine. The fuel injector has an electromagnetically actuated control valve element moveable between an open position and a closed position. The method includes commanding the injector to move the valve element. The method also includes collecting data about a current associated with the command. The method further includes determining if the valve element moved based on the data.

In at least one embodiment, the invention takes the form of a system for testing a fuel injector for an engine. The fuel injector has an electromagnetically actuated control valve element moveable between an open position and a closed position. The system includes a testing arrangement configured to command the injector to move the valve element, to collect data about a current associated with the command, and to output the data and a predetermined set of data.

BRIEF DESCRIPTION OF THE DRAWINGS

FIG. 1b shows a section of the fuel injector of FIG. 1a.

FIG. 1e shows a section of the fuel injector of FIG. 1a.

FIG. 1f shows a section of the fuel injector of FIG. 1a.

FIG. 3a shows a model of a fuel injector.

FIG. 3b shows a current trace of a properly functioning fuel injector.

FIG. 3c shows a current trace of a non-properly functioning fuel injector.

FIG. 3d shows a current trace of a non-properly functioning fuel injector.

DETAILED DESCRIPTION OF EMBODIMENTS OF THE INVENTION

Figure 1B:
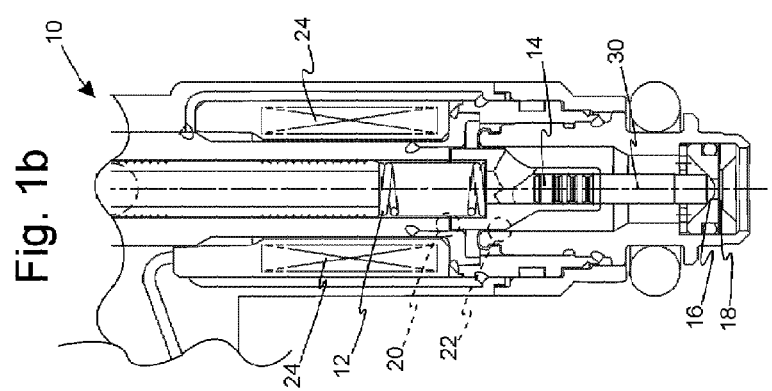
Figure 1C:
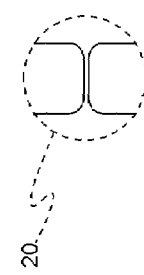
FIG. 1c shows a portion of the fuel injector of FIG. 1b.

FIGS. 1a through 1f show an electromagnetically actuated fuel injector 10 for engine 11. Injector 10 includes spring 12, moveable injector valve element 14, seat region 16, orifice plate 18, air gaps 20, 22, coil 24, and axis 30.

Figure 1E:
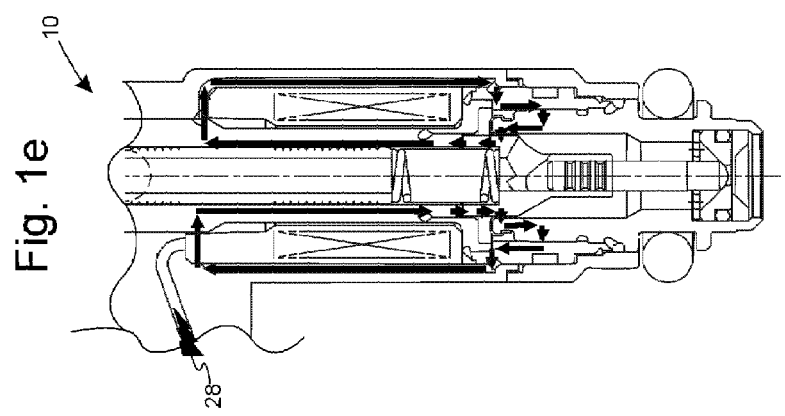
Figure 1D:
FIG. 1d shows a portion of the fuel injector of FIG. 1b.

FIG. 1e shows, via arrows, the magnetic flux path when current 28 is applied to coil 24. The magnetic flux path causes element 14 to move along axis 30 to close air gap 20, e.g., an open position. In the absence of current 28, injector 10 moves towards seat 16 by reason of a spring force from spring 12, e.g., a closed position.

Figure 1F:
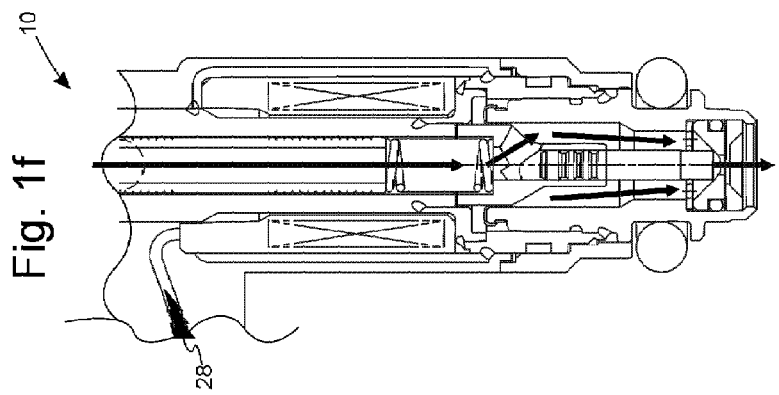
Figure 1A:
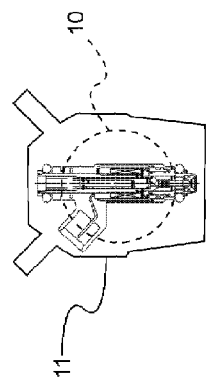
FIG. 1a shows a fuel injector of an engine.

FIG. 1f shows, via arrows, the path of fuel flow when current 28 is applied to coil 24.

Figure 2:
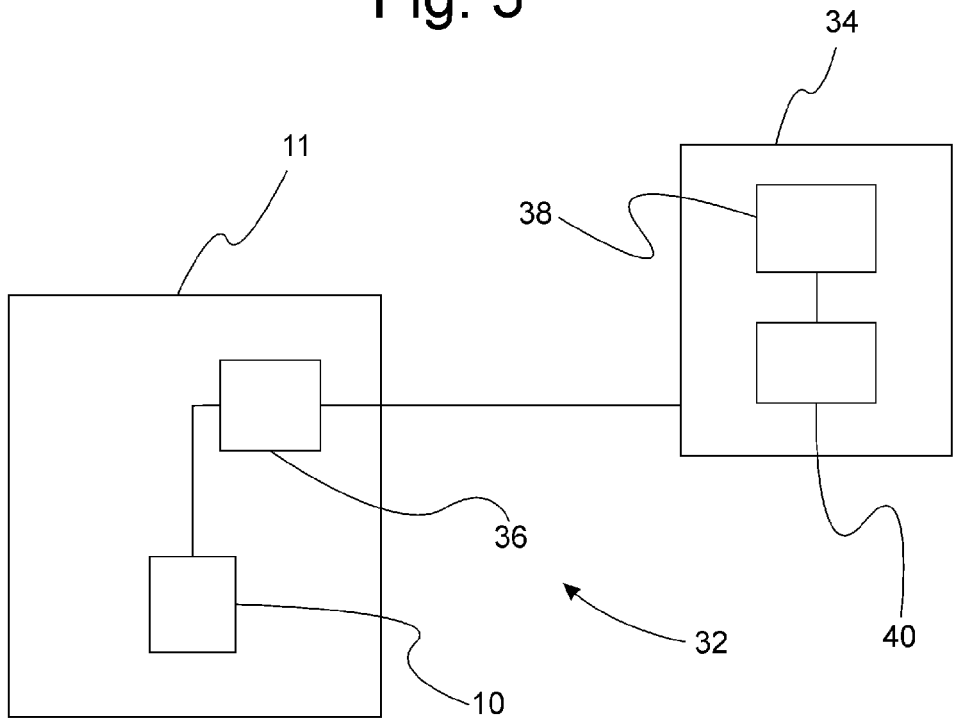
FIG. 2 shows a system for testing an electromagnetically actuated fuel injector.

FIG. 2 shows testing arrangement 32 for injector 10. Arrangement 32 includes engine 11 electrically connected with test stand 34 via electrical harness 36. Harness 36 is electrically connected with injector 10.

Stand 34 comprises a cold motoring test stand that operates semiautomatically and includes user interface 38 and computer 40. Stand 34 cold motors engine 11 such that engine 11 is not running under its own power. Computer 40 includes signature analysis software, such as from Sciemetric Instruments. The signature analysis software is used to analyze data about current 28 as explained in detail below.

FIG. 3a shows that injector 10 can be modeled as a resistance R in series with an inductance L. If V, e.g., 12 volts, R, and L are constant, I, should yield a first order response according to the relation $$V = L\frac{dI}{dt} + IR$$

as shown in FIGS. 3c and 3d as explained in detail below. If injector 10 is properly functioning, however, L will not be constant. Rather, L will vary with air gap 20 yielding the response shown in FIG. 3b.

If injector 10 is not properly functioning, the response will be different from that shown in FIG. 3b. For example, FIG. 3c shows a response where element 14 is stuck in the closed position, resulting in larger inductance L. FIG. 3d shows a response where element 14 is stuck in the open position, resulting in smaller inductance L.

Figure 4:
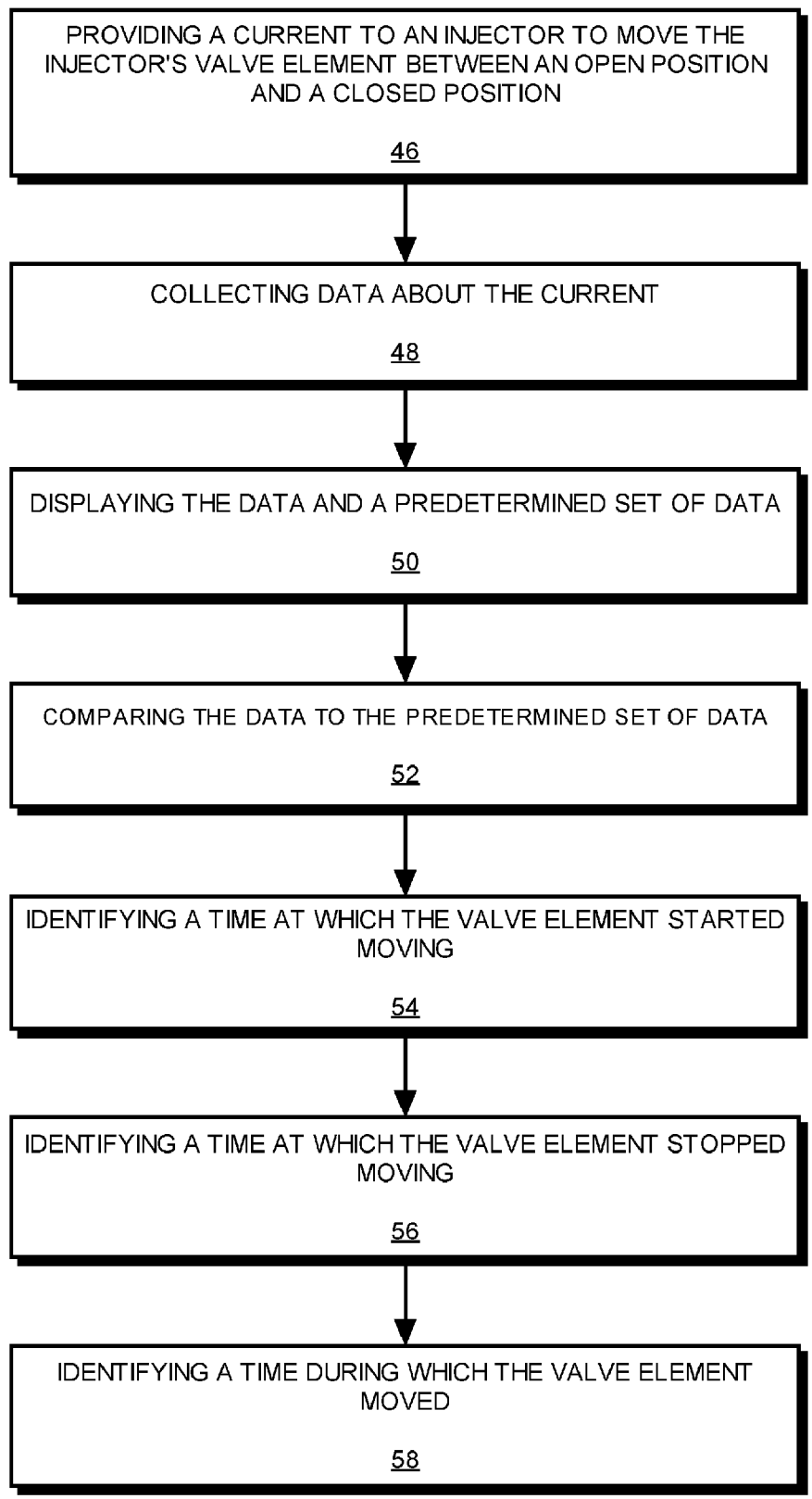
FIG. 4 shows a flow chart illustrating a strategy for testing an electromagnetically actuated fuel injector in accordance with an embodiment of the invention.

FIG. 4 shows a method for testing injector 10 of engine 11. At step 46, a current 28 is provided to coil 24 of injector 10 to move element 14 between an open position and a closed position. At step 48, data about current 28 is collected. At step 50, the data and a predetermined set of data is displayed. At step 52, the data is compared to the predetermined set of data to determine whether injector 10 is properly functioning. At step 54, a time is identified at which element 14 started moving. At step 56, a time is identified at which element 14 stopped moving. At step 58, a time is identified during which element 14 moved.

Figure 5:
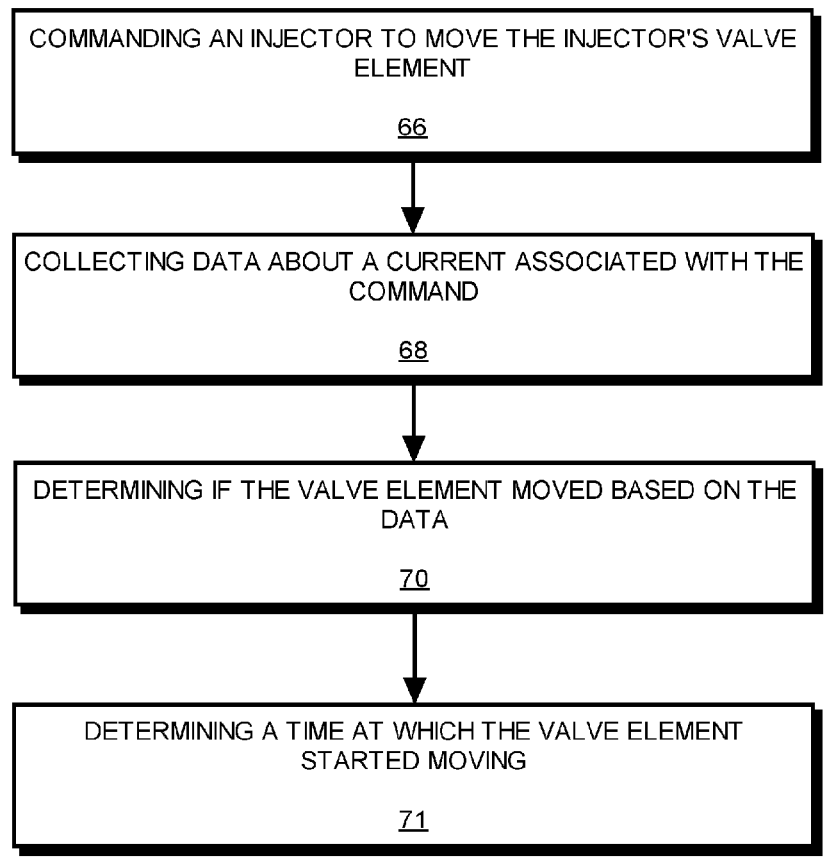
FIG. 5 shows a flow chart illustrating a strategy for testing an electromagnetically actuated fuel injector in accordance with an embodiment of the invention.

FIG. 5 shows a method for testing injector 10 of engine 11. At step 66, element 14 of injector 10 is commanded to move. At step 68, data about current 28 associated with the command is collected. At step 70, a determination is made as to if element 14 moved based on the data. At step 71, a time at which element 14 started moving is determined.

Figure 6A:
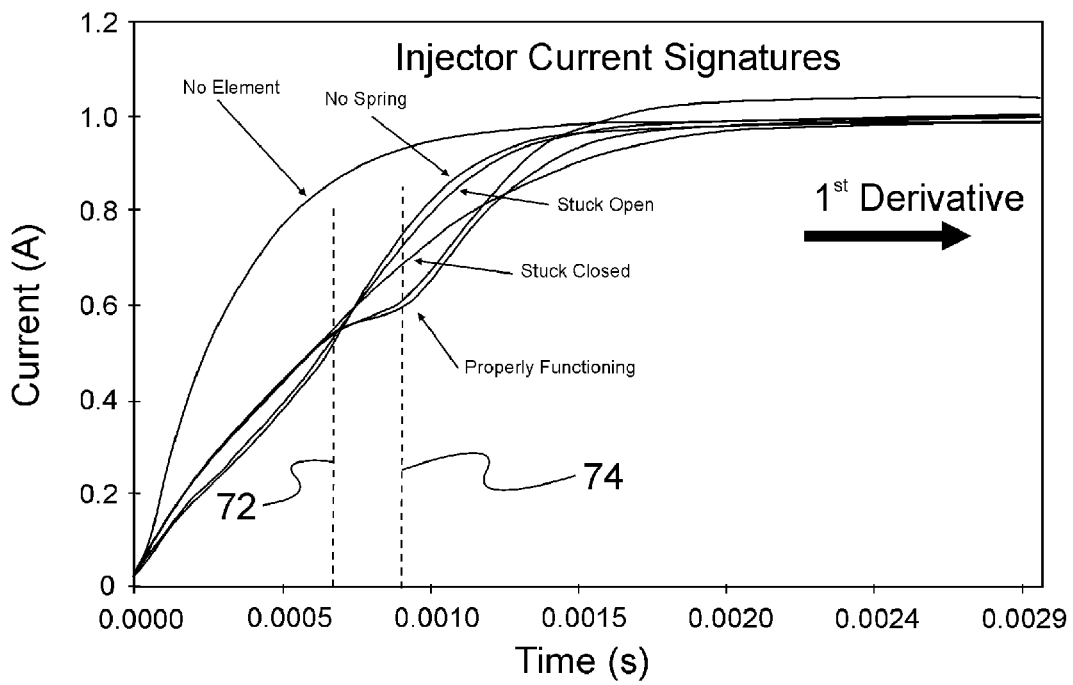
FIG. 6a shows current traces for properly functioning and non-properly functioning injectors.
Figure 6B:
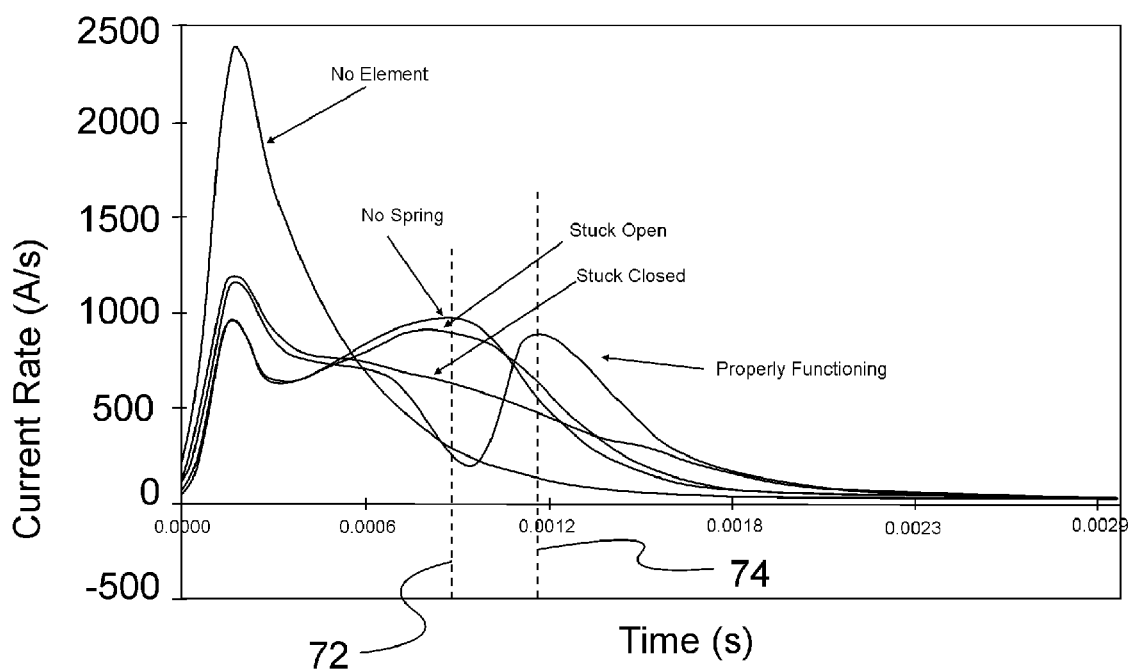
FIG. 6b shows rate of current change traces for properly functioning and non-properly functioning injectors.
Figure 6C:
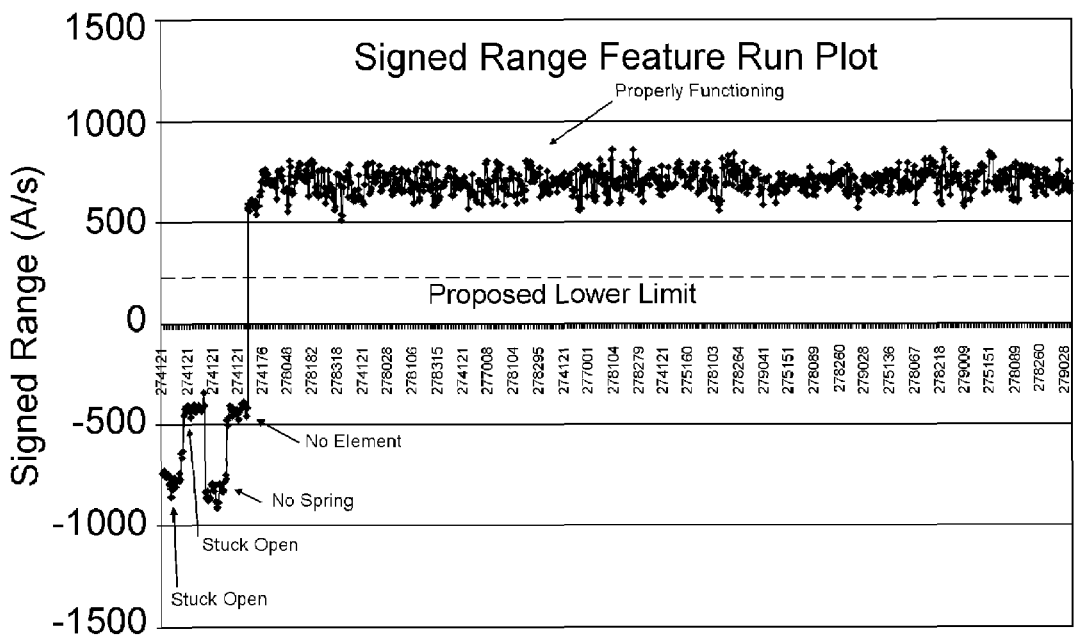
FIG. 6c shows a signed range of times during which valve elements of properly functioning and non-properly functioning injectors moved.

The data collected about current 28 may be current trace data, rate of current change trace data, or any other data about current 28, e.g., time data indicating a time during which element 14 moved. If current trace data, such as that shown in FIG. 6a, is collected, computer 40 may process the data, e.g., take the first derivative of the current trace data, via its signature analysis software, to generate rate of current change trace data as shown in FIG. 6b. Computer 40 may further process the rate of current change trace data to generate time data indicating a time, for each injector, during which element 14 moved as shown in FIG. 6c. Computer 40 may display the frequency of the time data of FIG. 6c as shown in FIG. 6d.

FIG. 6a shows an example set of current data and reveals five signatures: properly functioning, stuck closed, stuck open, no spring 12, and no element 14.

FIG. 6b shows an example set of rate of current change data for each of the five signatures. Several times can be identified, at least for properly functioning injectors, in FIG. 6a or 6b: time 72 at which element 14 started moving, time 74 at which element 14 stopped moving, and the difference between time 74 and time 72 which is the time during which element 14 moved.

Figure 6D:
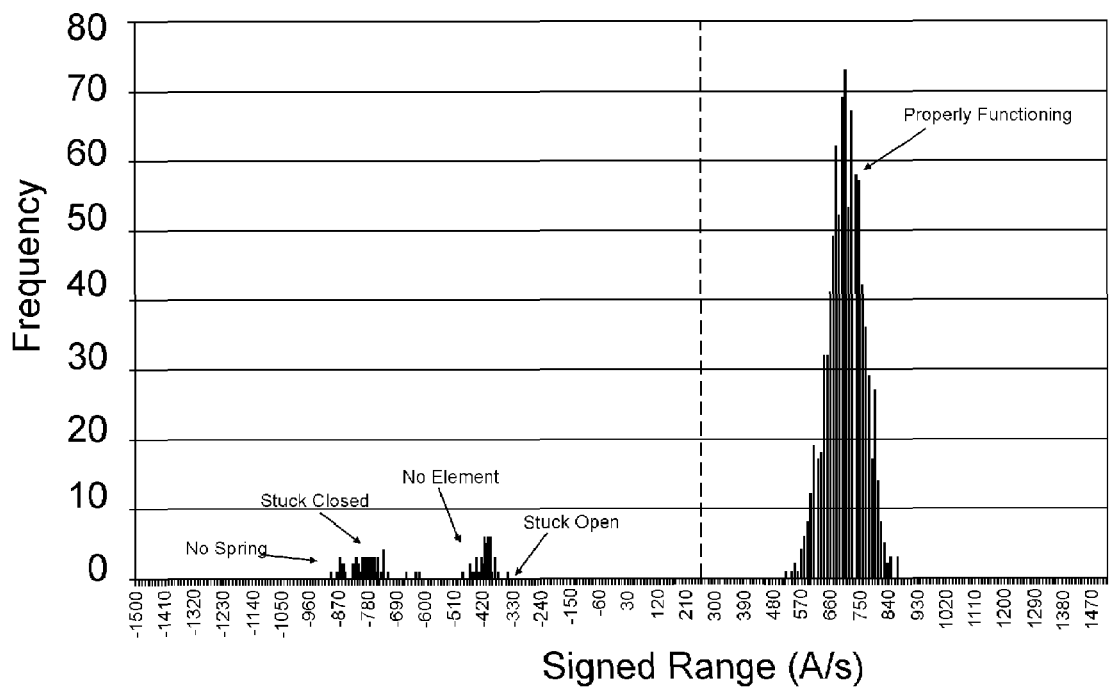
FIG. 6d shows a frequency of the signed range of times of FIG. 6c.

FIGS. 6c and 6d show alternative ways to analyze the data of FIGS. 6a and 6b to differentiate properly functioning injectors from non-properly functioning injectors. For example, the signed peak to valley time difference of rate of current change data similar to that of FIG. 6b, for a number of injectors, can be plotted as shown in FIG. 6c. The frequency of the times of FIG. 6c are shown in FIG. 6d. The data, however, may be analyzed in any suitable fashion.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for testing a fuel injector for an engine, the fuel injector having an electromagnetically actuated control valve element, the method comprising:
   commanding the injector to move the valve element between an open position and a closed position;
   collecting data about a current associated with the command;
   comparing the data to a predetermined set of data wherein the predetermined set of data includes at least one current trace of several possible current traces including a current trace for an injector missing the valve element, a current trace for an injector missing a spring, a current trace for an injector with the valve element stuck in the open position, and a current trace for an injector with the valve element stuck in the closed position; and
   determining if the injector is functioning properly based on the comparison between the data and the predetermined set of data.

2. The method of claim 1 wherein the predetermined set of data further includes a current trace for a properly functioning injector.

3. The method of claim 1 wherein the predetermined set of data further includes a rate of current change trace for a properly functioning injector.

4. The method of claim 1 wherein the predetermined set of data further includes at least one rate of current change trace of several possible rate of current change traces including a rate of current change trace for an injector missing the valve element, a rate of current change trace for an injector missing a spring, a rate of current change trace for an injector with the valve element stuck in the open position, and a rate of current change trace for an injector with the valve element stuck in the closed position.

5. The method of claim 1 further comprising identifying a time at which the valve element started moving.

6. The method of claim 1 further comprising identifying a time at which the valve element stopped moving.

7. The method of claim 1 further comprising identifying a time during which the valve element moved.

8. The method of claim 1 further comprising displaying the data and the predetermined set of data.

9. A method for testing a fuel injector for an engine, the fuel injector having an electromagnetically actuated control valve element, the method comprising:
   providing a current to the injector to move the valve element between an open position and a closed position;
   collecting data about the current;
   comparing the data to a predetermined set of data wherein the predetermined set of data includes at least one of a rate of current change trace for a properly functioning injector and a rate of current change trace for a non-properly functioning injector; and
   determining if the injector is functioning properly based on the comparison between the data and the predetermined set of data.

10. The method of claim 9 wherein the predetermined set of data further includes a current trace for a properly functioning injector.

11. The method of claim 9 wherein the predetermined set of data farther includes at least one current trace of several possible current traces including a current trace for an injector missing the valve element, a current trace for an injector missing a spring, a current trace for an injector with the valve element stuck in the open position, and a current trace for an injector with the valve element stuck in the closed position.

12. The method of claim 9 wherein the rate of current change trace for a non-properly functioning injector includes at least one of a rate of current change trace for an injector missing the valve element, a rate of current change trace for an injector missing a spring, a rate of current change trace for an injector with the valve element stuck in the open position, and a rate of current change trace for an injector with the valve element stuck in the closed position.

13. The method of claim 9 further comprising at least one of identifying a time at which the valve element staffed moving, identifying a time at which the valve element stopped moving, and identifying a time during which the valve element moved.

14. The method of claim 9 further comprising displaying the data and the predetermined set of data.

15. A system for testing a fuel injector for an engine, the fuel injector having an electromagnetically actuated control valve element moveable between an open position and a closed position, the system comprising:
   a testing arrangement configured to command the injector to move the valve element, to collect data about a current associated with the command, and to output the data and a predetermined set of data thereby enabling a user to determine if the injector is functioning properly based on the data and the predetermined set of data wherein the predetermined set of data includes at least one of a rate of current change trace for a properly functioning injector and a rate of current change trace for a non-properly functioning injector.

16. The system of claim 15 wherein the testing arrangement is portable.

17. The system of claim 15 wherein the predetermined set of data further includes at least one of a current trace for a properly functioning injector and a current trace for non-properly functioning injector.

* * * * *